United States Patent
Gibson et al.

(10) Patent No.: US 11,326,064 B2
(45) Date of Patent: May 10, 2022

(54) ULTRAVIOLET PROTECTIVE COATING FOR FABRICATING EPOXY-BASED COMPONENTS

(71) Applicant: The Boeing Company, Chicago, IL (US)

(72) Inventors: Loren F. Gibson, Charleston, SC (US); Nelson N. Akwari, Summerville, SC (US); Heath D. Kaufman, Moncks Corner, SC (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 16/706,889

(22) Filed: Dec. 9, 2019

(65) Prior Publication Data

US 2020/0109298 A1 Apr. 9, 2020

Related U.S. Application Data

(62) Division of application No. 15/584,915, filed on May 2, 2017, now Pat. No. 10,533,099.

(51) Int. Cl.
    *C09D 5/32* (2006.01)
    *C09D 175/04* (2006.01)

(52) U.S. Cl.
    CPC ............ *C09D 5/32* (2013.01); *C09D 175/04* (2013.01)

(58) Field of Classification Search
    CPC ................................ C09D 5/32; C09D 175/04
    See application file for complete search history.

(56) References Cited

U.S. PATENT DOCUMENTS

| 7,897,202 | B2 | 3/2011 | Werner et al. |
| 10,533,099 | B2 | 1/2020 | Gibson et al. |
| 2011/0268964 | A1* | 11/2011 | Dornbusch .......... C09D 175/04 428/334 |
| 2018/0320004 | A1 | 11/2018 | Gibson et al. |

OTHER PUBLICATIONS

"Safety Data Sheet for 09BR003 Base Component", PPG, Version 6.01, Retrieved from the Internet: https://buyat.ppg.com, Nov. 17, 2016, 15 pgs.

(Continued)

*Primary Examiner* — Robert S Walters, Jr.
(74) *Attorney, Agent, or Firm* — Kwan & Olynick LLP

(57) ABSTRACT

Provided are epoxy-based components and methods of fabricating such components. Specifically, an component comprises an epoxy-based composite part and a UV protective coating disposed over the part. This coating allows for the component to be exposed to UV radiation without any additional coating and without deterioration of the epoxy-based composite part. Specifically, the component may be exposed to interior lights and direct sun during its subsequent fabrication and/or transportation. The UV protective coating comprises polyurethane and silicate filler, such as hydrated aluminum silicate and/or hydrated magnesium silicate. The coating may have a transmittance of less than 1% or even less than 0.1% in the UV range. An epoxy primer layer may be formed directly over the UV protective coating followed by various other coatings, including a decorative finish.

20 Claims, 5 Drawing Sheets

(56) References Cited

OTHER PUBLICATIONS

"Safety Data Sheet for 09BR003 Curing Solution Component", PPG, Version 5, Retrieved from the Internet: https://buyat.ppg.com, Jun. 14, 2016, 16 pgs.
U.S. Appl. No. 15/548,915, Final Office Action dated Sep. 6, 2019, 6 pgs.
U.S. Appl. No. 15/548,915, Notice of Allowance dated Nov. 6, 2019, 7 pgs.
U.S. Appl. No. 15/548,915, Restriction Requirement dated Nov. 20, 2018, 7 pgs.
U.S. Appl. No. 15/548,915, Non Final Office Action dated Mar. 21, 2019, 6 pgs.

* cited by examiner

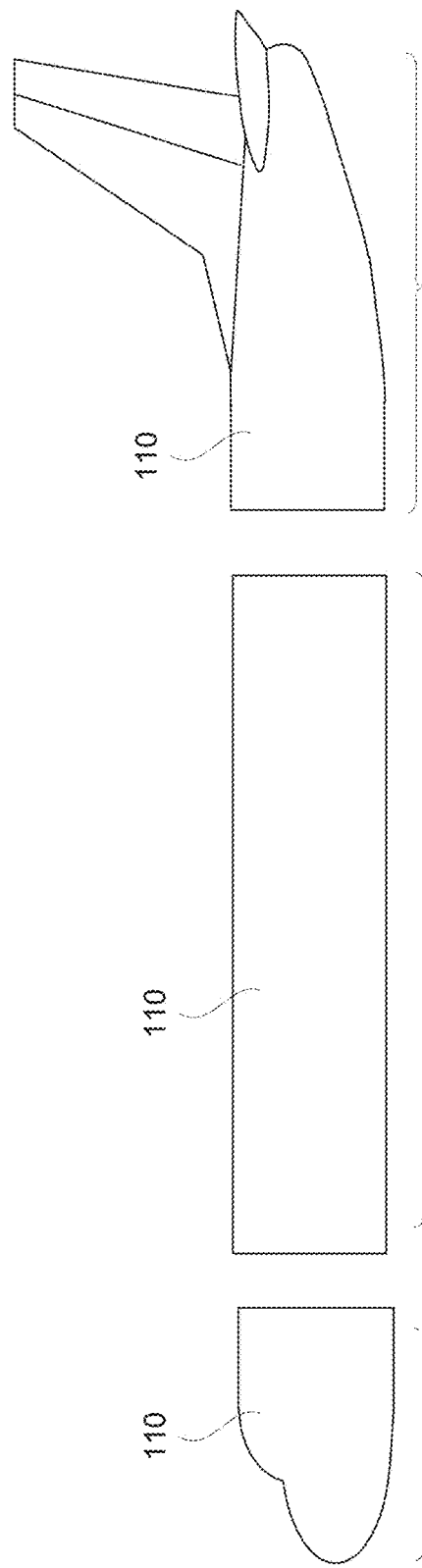
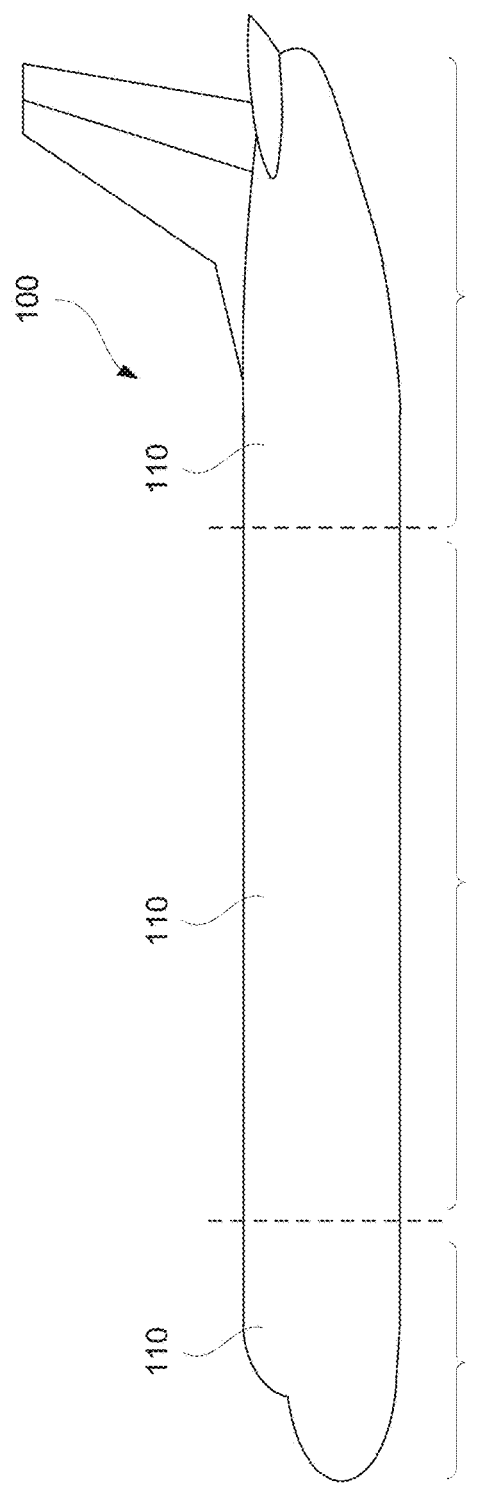

ULTRAVIOLET PROTECTIVE COATING FOR FABRICATING EPOXY-BASED COMPONENTS

CROSS-REFERENCE TO RELATED APPLICATIONS

This application is a divisional of U.S. patent application Ser. No. 15/584,915, filed on May 2, 2017, which is incorporated herein by reference in its entirety for all purposes.

BACKGROUND

Composite materials, such as carbon fiber-reinforced polymers (CFRP), are widely used for fabricating various components due to high strength and rigidity, low weight, corrosion resistance, and other favorable properties of these composites. Specifically, many composite materials are increasingly used in aircraft fabrication, e.g., to form fuselage, wings, tail sections, skin panels, and other components. However, some composite materials, especially epoxy-based composites such as epoxy-graphite composites, are ultraviolet (UV) sensitive. These composite materials may degrade if not protected and exposed UV radiation, such as direct sun exposure and/or interior lighting used on manufacturing floor, both of which may include some UV radiation.

SUMMARY

Provided are epoxy-based components and methods of fabricating such components. Specifically, an component comprises an epoxy-based composite part and a UV protective coating disposed over the part. This coating allows for the component to be exposed to UV radiation without any additional coating and without deterioration of the epoxy-based composite parts. The UV protective coating protects an epoxy based surfacing film as well as epoxy pre-impregnated carbon fiber composite. Specifically, the component may be exposed to interior lights and direct sun during its subsequent fabrication and/or transportation. The UV protective coating comprises polyurethane and silicate filler, such as hydrated aluminum silicate and/or hydrated magnesium silicate. The coating may have a transmittance of less than 1% or even less than 0.1% in the UV range. An epoxy primer layer may be formed directly over the UV protective coating followed by various other coatings, including a decorative finish.

In some examples, a method of fabricating an epoxy-based component comprises curing an epoxy-based composite part. The epoxy-based composite part comprises a composite base having a surface. The composite base comprises epoxy. The epoxy-based composite part further comprises a surfacing film disposed over the surface of the composite base.

The method proceeds with forming an ultraviolet (UV) protective coating directly over and in contact with at least a portion of the surfacing film of the epoxy-based composite part. The UV protective coating comprises polyurethane and silicate filler. The silicate filler comprises a silicate selected from the group consisting of hydrated aluminum silicate and hydrated magnesium silicate. In some examples, both hydrated aluminum silicate and hydrated magnesium silicate are present in the UV protective coating. Furthermore, the UV protective coating may also comprise titanium oxide. The concentration of the silicate filler in the UV protective coating may be at least about 20% by weight or, more specifically, at least about 40% by weight.

In some examples, the method further comprises forming an epoxy primer layer directly over and in contact with the UV protective coating. The method may proceed with forming a polyamide-based coating directly and in contact with over the epoxy primer layer. The method may further comprise forming a decorative finish directly and in contact with over the polyamide-based coating. Alternatively, the method may comprise forming a polyurethane topcoat directly over and in contact with the polyamide-based coating and before forming the decorative finish. The method then proceed with forming the decorative finish directly over and in contact with the polyurethane topcoat.

In some examples, the surfacing film remains substantially unexposed to UV radiation after curing the epoxy-based composite part and prior to forming the UV protective coating. For example, the maximum exposure between curing the epoxy-based composite part and forming the UV protective coating may be less than 200 kJ/m$^2$ ultraviolet (UV-A) radiation. Furthermore, forming the UV protective coating is performed in an environment substantially free from UV radiation such that the epoxy-based composite part is not exposed to UV radiation while forming the UV protective coating or UV exposure is minimal such that the epoxy-based composite part remains unaffected. Once the UV protective coating is formed over the epoxy-based composite part, the assembly can be exposed to UV radiation without risk of damaging the epoxy-based composite part.

In some examples, the method further comprises, prior to forming the UV protective coating, testing the surfacing film of the epoxy-based composite part for UV degradation. For example, this testing may involve wiping the surfacing film with a wipe saturated with acetone and inspecting the wipe for residues. In some examples, the method further comprises, prior to forming the UV protective coating, sanding the surfacing film.

Forming the UV protective coating may comprise spraying a UV protective liquid material onto the epoxy-based composite part. Furthermore, forming the UV protective coating may comprise curing the UV protective liquid material. Curing the UV protective liquid material may be performed at a room temperature.

In some examples, the UV protective coating has a thickness of between 10 micrometers to 100 micrometers or, more specifically, between 30 micrometers to 65 micrometers. Even at such small thicknesses, the UV protective coating may sufficiently block UV radiation. In some examples, the UV protective coating has a transmittance of less than 1% in a wavelength range of 100 nanometers and 400 nanometers or, more specifically, less than 0.1% in a wavelength range of 100 nanometers and 400 nanometers.

In some examples, the ultraviolet (UV) protective coating is formed over a portion of the surfacing film of the epoxy-based composite part, while another portion of the surfacing film remains exposed. In these examples, the method may comprise covering the exposed portion of the surface layer of the epoxy-based composite part with a protective sheet.

Also provided is an epoxy-based component. The epoxy-based component comprises an epoxy-based composite part and an ultraviolet (UV) protective coating. The epoxy-based composite part comprises a composite base comprising epoxy and having a surface. The epoxy-based composite part further comprises a surfacing film, disposed over the surface of the composite base. The ultraviolet (UV) protective coating may be disposed directly over and in contact with at least a portion of the surfacing film of the epoxy-based composite part. The UV protective coating may comprise polyurethane and silicate filler. The silicate filler may comprise a silicate selected from the group consisting of hydrated aluminum silicate and hydrated magnesium silicate. The concentration of the silicate filler in the UV protective coating is at least about 20% by weight.

In some examples, the epoxy-based component further comprises an epoxy primer layer, disposed directly over and in contact with the UV protective coating. The epoxy-based component may also comprise a polyimide-based coating disposed directly over and in contact with the epoxy primer layer. In some embodiments, the epoxy-based component further comprises a decorative finish disposed directly over and in contact with the polyamide-based coating. The epoxy-based component may also comprise a polyurethane topcoat and a decorative finish. The polyurethane topcoat may be disposed directly over and in contact with the polyamide-based coating. The decorative finish is disposed directly over and in contact with the polyurethane topcoat.

In some examples, the UV protective coating has a thickness of between 30 micrometers to 65 micrometers. The silicate filler may comprise both hydrated aluminum silicate and hydrated magnesium silicate. In some examples, the UV protective coating further comprises titanium oxide. The UV protective coating may have a transmittance of less than 1% in a wavelength range of 100 nanometers and 400 nanometers or, more specifically, less than 0.1% in a wavelength range of 100 nanometers and 400 nanometers. The epoxy-based component may be selected from the group consisting of a nose section, a tail section, and a middle section.

The features and functions that have been discussed can be achieved independently in various examples or may be combined in yet other examples further details of which can be seen with reference to the following description and drawings.

BRIEF DESCRIPTION OF THE DRAWINGS

FIGS. 1A-1C are schematic illustrations of different epoxy-based components, in accordance with some examples.

FIG. 1D is a schematic illustration of the epoxy-based components of FIGS. 1A-1C forming a fuselage of an aircraft, in accordance with some examples.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.
Introduction Epoxy-based composites or, more specifically, epoxy-based materials comprising graphite, which are sometimes referred to as carbon fiber-reinforced plastics, are very strong, lightweight, and have other desirable properties. Such composites may be used to fabricate various types of components, such as aircraft components where a combination of mechanical stress and low weight is highly desirable. However, other types of epoxy-based components are also within the scope, such as automotive parts. The fabricated components can be made into various geometric forms and sizes.

The process may involve layering sheets of carbon fiber cloth into a mold. The internal cavity of the mold may be shaped as the fabricated component. The process continues with filling the mold with epoxy and curing the composite. The epoxy may be a phenol or cresol (e.g., bisphenol-A) and a crosslinking agent (e.g., epichlorohydrin). The type and alignment of carbon fibers may be selected to optimize the strength and stiffness properties of the fabricated component.

One drawback of epoxy-based composites is their IN degradation, in particular at a 290-400 nm of UV spectrum. This spectrum is comparable to dissociation energies of polymer covalent bonds found in epoxies used for composite materials. Specifically, UV radiation absorbed by epoxies causes photo-oxidative reactions resulting in material degradation, which corresponds molecular weight reduction as well as reduction of mechanical strength and heat resistance.

Even short periods of IN exposure can change surface morphology of epoxy-based composites. For example, the surface of a composite may exhibit a distinct color change from black to dark green. This color change may serve as a way for monitoring the degradation process. Changes in surface smoothness may also be observed.

Figure 2:
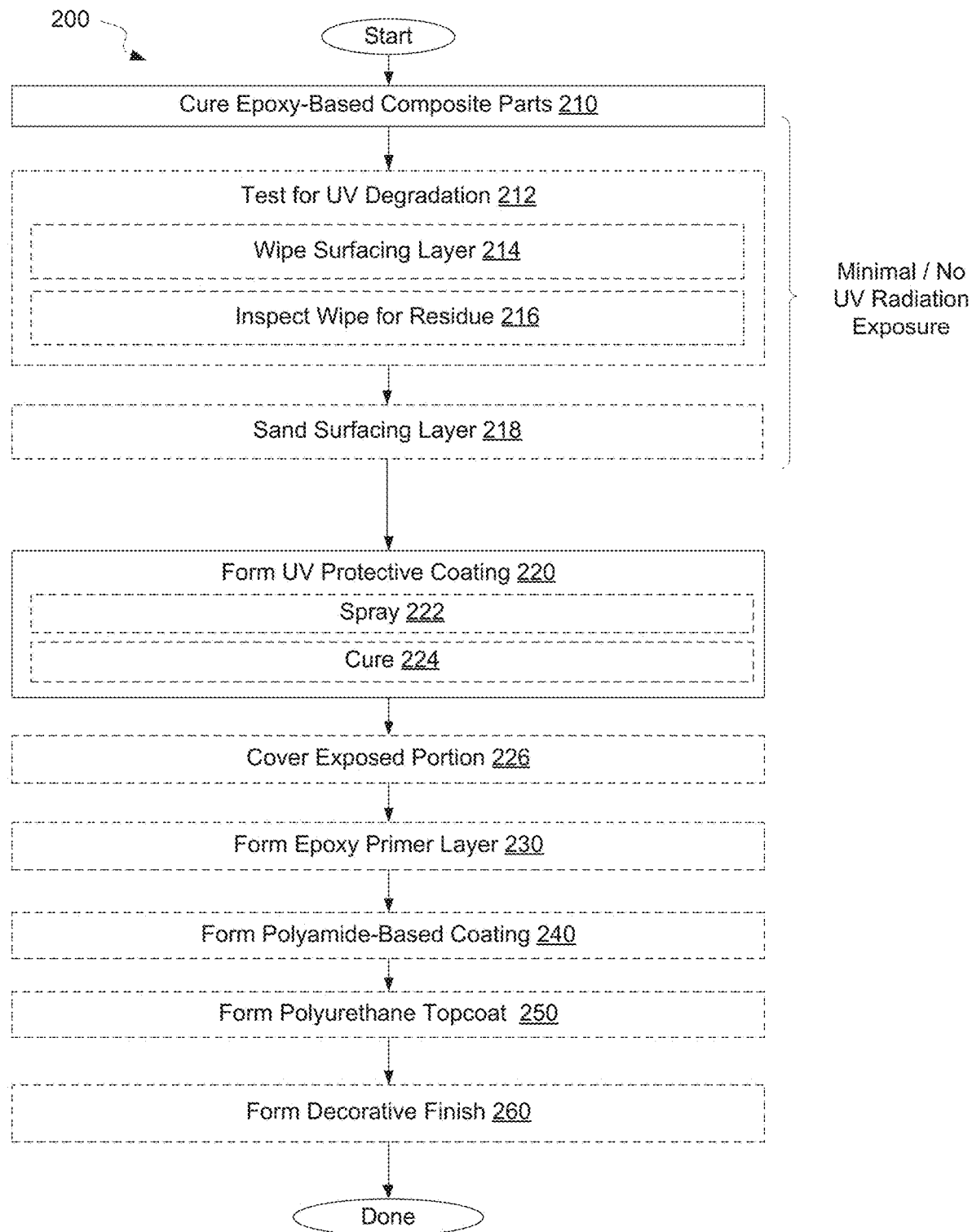
FIG. 2 is a process flowchart corresponding to a method of fabricating an epoxy-based component, in accordance with some examples.

It should be noted that UV radiation is present, at some level, in the sun light and artificial light sources that illuminate manufacturing facilities. Protecting of epoxy-based fabricated components can be difficult, in particular when these composites are large structures, such as fuselage components of aircraft. FIGS. 1A-1C are schematic illustrations of different aircraft epoxy-based components 110, in accordance with some examples. In these examples aircraft epoxy-based components 110 are nose section 112, tail section 116, and middle section 114 of aircraft fuselage 100. Aircraft epoxy-based components 110 may be processed and receive a UV protective coating prior to assembling these components together, e.g., to form aircraft fuselage 100 as, for example, schematically shown in FIG. 1D.
Processing Examples FIG. 2 is a process flowchart corresponding to method 200 of fabricating epoxy-based component 110, in accordance with some examples. Some examples of epoxy-based components are described above and may include a nose section, a tail section, and/or a middle section, in some examples. For example, epoxy-based component 110 may be a wing-box. Other examples of epoxy-based components are also within the scope.

In some examples, method 200 involves curing epoxy-based composite part 300 during operation 210. Operation 210 may involve layering sheets of carbon fiber cloth (e.g., a prepreg material) into the mold and filling the mold with epoxy. In some examples, the sheets are layered using a layup machine, such as an automated tape layup machine. The surface of the mold, which received the sheets, may be treated with a release agent or a film. Multiple sheets may be applied one on top of the other until a desired thickness is achieved and desired orientation of the reinforcement fibers is achieved for maximum strength and efficiency. In some examples, the layered structure is subjected to an optional pre-cure vacuum hold under a vacuum pressure. Operation 210 may then involve heat curing epoxy-based composite part 300 in a heating apparatus (e.g., an autoclave). The heat curing may be performed under vacuum. The temperature and duration of heat curing depends on epoxy used for epoxy-based composite part 300 and other factors.

Figure 3A:
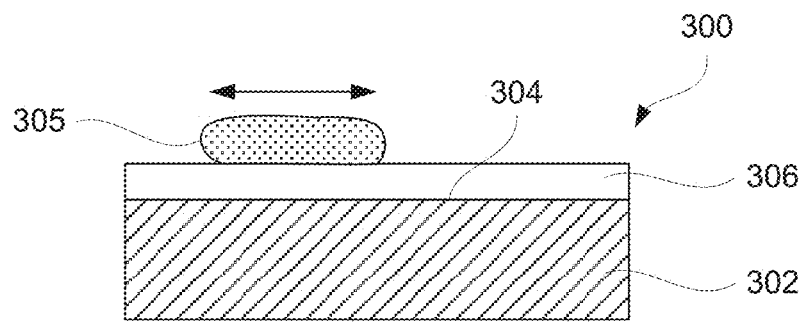
FIGS. 3A-3E are examples of epoxy-based components at different stages of the method presented in FIG. 2.
Figure 3B:
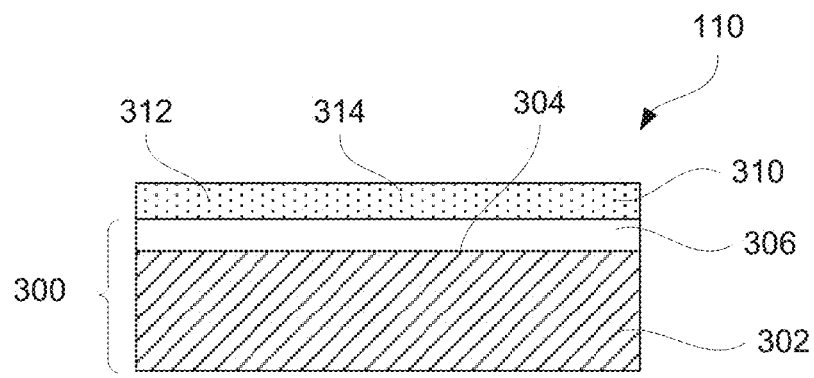

Referring to FIG. 3A, epoxy-based composite part 300 may comprises composite base 302 having surface 304. Composite base 302 may be an epoxy prepreg resin having carbon fibers disposed within. The carbon fibers may be in a woven fabric form. More specifically, epoxy-based composite part 300 may be a carbon fiber reinforced polymer composite (CFRP). In some examples, epoxy-based composite part 300 comprises surfacing film 306. The composition of surfacing film 306 may be different from the composition of composite base 302. For example, surfacing film 306 may have a higher concentration of epoxy than composite base 302, e.g., a resin-rich shell that blocks fiber read-through and enhances paint adhesion. In some examples, surfacing film 306 may comprises a different polymer than composite base 302, e.g., polyurethane/polycarbonate, polyester, and the like.

Method 200 may also involve testing surfacing film 306 of epoxy-based composite part 300 for UV degradation during optional operation 212. For example, operation 212 may involve wiping surfacing film 306 with wipe 305, referring to block 214 in FIG. 2 and a schematic illustration in FIG. 3A. Wipe 305 may be saturated with acetone. For example, the same spot on epoxy-based composite part 300 may be wiped between 10-20 times using a heavy hand pressure.

Operation 212 may also involve inspecting wipe 305 for residues, referring to block 216 in FIG. 2. FIG. 3A is s schematic illustration of surfacing film 306 being wiped with wipe 305. It would be understood that if optional operation 212 is performed, operation 212 is performed prior to forming UV protective coating 310 during operation 220.

Without being bound to any particular theory, it is believed that UV degradation of epoxy-based composite part 300 may produce quinone, hydroquinone, or alkyl ketone products on the surface. This may result in discoloration of the surface or, more specifically, producing green residue on the surface of epoxy-based composite part 300. Wiping during operation 214 may transfer this residue to from the surface to wipe 305. Furthermore, small amounts of residue may not detectable directly on the surface but when concentrated on wipe 305, this residue may be more detectable. For example, the same wipe 305 may be used to wipe a large area of the surface.

Method 200 may also involve sanding surfacing film 306 during optional operation 218. Sanding surfacing film 306 may be used to remove any residue resulting from UV degradation of epoxy-based composite part 300. Furthermore, sanding surfacing film 306 may increase the surface roughness of surfacing film 306 to improve bonding to UV protective coating 310. It would be understood that if optional operation 218 is performed, operation 218 is performed prior to forming UV protective coating 310 during operation 220.

Returning to FIG. 2, method 200 may proceed with forming UV protective coating 310 during operation 220. UV protective coating 310 may be formed directly over and in contact with at least a portion of surfacing film 306 of epoxy-based composite part 300 as, for example, shown in FIG. 313. FIG. 313 is a schematic illustration of epoxy-based component 110 after completing operation 220. At this stage, epoxy-based component 110 comprises epoxy-based composite part 300 with UV protective coating 310 disposed over epoxy-based composite part 300. If epoxy-based composite part 300 comprises surfacing film 306, then UV protective coating 310 may be disposed over surfacing film 306 or, more specifically, directly over and in contact with surfacing film 306. If epoxy-based composite part 300 does not have surfacing film 306, then UV protective coating 310 may be disposed over composite base 302 or, more specifically, directly over and in contact with composite base 302.

UV protective coating 310 comprises polyurethane 312 and silicate filler 314, such as hydrated aluminum silicate and/or hydrated magnesium silicate. The concentration of silicate filler 314 in UV protective coating 310 may be at least about 20% by weight or, more specifically, at least about 40% by weight. In some examples, silicate filler 314 is uniformly distributed throughout the entire volume of UV protective coating 310. Likewise, polyurethane 312 may be uniformly distributed throughout the entire volume of UV protective coating 310. For purposes of this disclosure, the term "uniformly distributed" means that the concentration of a component varies by less than 10 weight % throughout the entire volume.

UV protective coating 310 may have a thickness of between 10 micrometers to 100 micrometers of, more specifically, between 30 micrometers to 65 micrometers. As further described below with reference to FIG. 4, UV protective coating 310 provides sufficient blockage of UV radiation even at such low thicknesses. Furthermore, a lower thickness of UV protective coating 310 corresponds to a lower added weight to a subassembly comprising UV protective coating 310, which may be important for aircraft applications.

Silicate filler 314 of UV protective coating 310 may comprise one or both hydrated aluminum silicate (e.g., kaolin) and hydrated magnesium silicate (e.g., talc). In some examples, UV protective coating 310 further comprises titanium oxide. UV protective coating 310 may comprise silica.

Forming 220 UV protective coating 310 may comprise spraying a UV protective liquid material (block 222 in FIG. 2). However, other disposition techniques, such as brushing, rolling, and the like are also within the scope. In some examples, the UV protective liquid material includes one or more acetates, such as n-butyl acetate and/or 2-methoxy-1-methylethyl acetate.

Forming 220 UV protective coating 310 may also comprise curing the UV protective liquid material (block 224 in FIG. 2). Curing operation 224 may be performed at a room temperature. The curing duration may be between about 0.5 hours and 2 hours.

In some examples, surfacing film 360 remains substantially unexposed to UV radiation after curing of epoxy-based composite part 300 during operation 210 and prior to forming UV protective coating 310 during operation 220. For example, maximum exposure between the curing operation and the UV protective coating forming operational may be less than 200 kJ/m$^2$ ultraviolet UV-A radiation or even less than 100 kJ/m$^2$ ultraviolet UV-A radiation. Furthermore, forming UV protective coating 310 during operation 220 may be performed in an environment substantially free from UV radiation (e.g., a manufacturing facility with a special lighting). These features ensure that epoxy-based composite part 300 does not experience UV degradation before forming UV protective coating 310.

Method 200 may proceed with forming epoxy primer layer 320 during optional operation 230. Epoxy primer layer 320 may be formed directly over and in contact with UV protective coating 310. Epoxy primer layer 320 may comprise one or more polyfunctional amine-containing compounds or a bisphenol-A-diglycidyl ether (e.g., cured with triethylene tetramine). For example, an epoxy resin dissolved in tert-butyl acetate may be used to form epoxy primer layer 320.

Method 200 may proceed with forming polyamide-based coating 330 during optional operation 240. Polyamide-based coating 330 may be formed directly and in contact with over epoxy primer layer 320.

Method 200 may involve forming polyurethane topcoat 340 during optional operation 250. Polyurethane topcoat 340 may be formed directly over and in contact with polyamide-based coating 330.

Method 200 may involve forming decorative finish 350 during optional operation 260. Decorative finish 350 may be formed directly and in contact with polyamide-based coating 330. Alternatively, decorative finish 350 may be formed directly and in contact with polyurethane topcoat 340, if polyurethane topcoat 340 was previously formed.

Epoxy-Based Component Examples

Figure 3C:
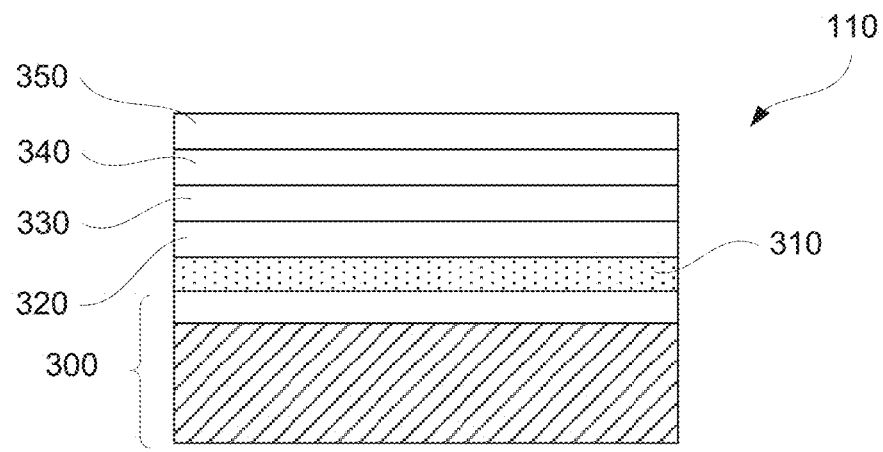

FIG. 3C is a schematic illustration of epoxy-based component 110 comprising epoxy-based composite part 300, UV protective coating 310 disposed over epoxy-based composite part 300, epoxy primer layer 320 disposed over UV protective coating 310, polyamide-based coating 330 disposed over epoxy primer layer 320, polyurethane topcoat 340 disposed over polyamide-based coating 330, and decorative finish 350 disposed over polyurethane topcoat 340. It should be noted that even though one or more of polyamide-based coating 330, polyurethane topcoat 340, and decorative finish 350 may provide UV protection once these layers are formed, UV protective coating 310 remains as a part of epoxy-based component 110. As such, UV protective coating 310 provides UV protection until though one or more of polyamide-based coating 330, polyurethane topcoat 340, and decorative finish 350 are formed. Furthermore, UV protective coating 310 allows using additional options for one or more of polyamide-based coating 330, polyurethane topcoat 340, and decorative finish 350 that may not have been previously available since epoxy-based composite part 300 is already protected from UV degradation by UV protective coating 310.

FIG. 3C is a schematic illustration of another example of epoxy-based component 110 that does not have polyurethane topcoat 340. In this example, UV protective coating 310 is also disposed over epoxy-based composite part 300, epoxy primer layer 320 is disposed over UV protective coating 310, polyimide-based coating 330 is disposed over epoxy primer layer 320. However, decorative finish 350 is disposed directly over and interfaces with polyamide-based coating 330.

Figure 3D:
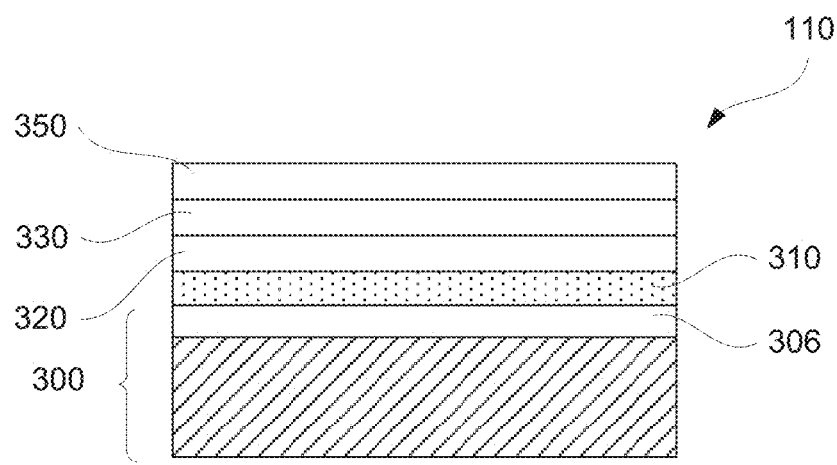
Figure 3E:
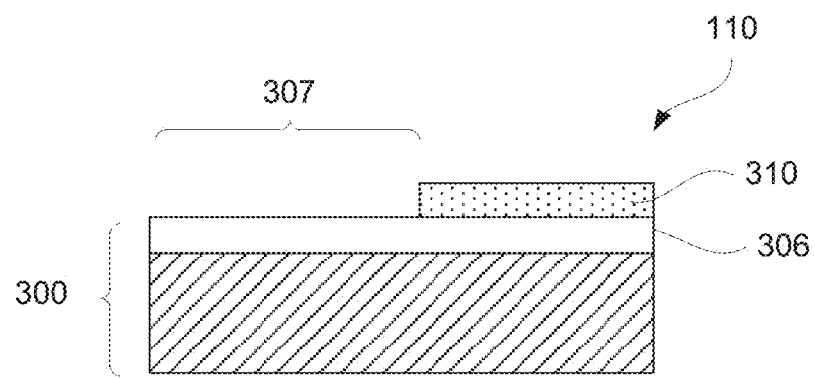

FIG. 3D illustrates another example where epoxy-based composite part 300 is only partially covered with UV protective coating 310. As such, epoxy-based composite part 300 has exposed portion 307, which may be protected from UV degradation by other means.

In general, epoxy-based component 110 may comprises at least epoxy-based composite part 300 and UV protective coating 310. Epoxy-based composite part 300 may comprise composite base 302, having surface 304. In some examples, epoxy-based composite part 300 also comprises surfacing film 306, disposed over surface 304 of composite base 302. Alternatively, epoxy-based composite part 300 may not have surfacing film 306.

UV protective coating 310 may be disposed directly over and in contact with at least a portion of surfacing film 306, if surfacing film 306 is present. If surfacing film 306 is not present, then UV protective coating 310 may be disposed directly over and in contact with at least a portion of composite base 302.

UV protective coating 310 may comprise polyurethane 312. Furthermore, UV protective coating 310 may comprise silicate filler 314, such as hydrated aluminum silicate and hydrated magnesium silicate. In some examples, UV protective coating 310 both hydrated aluminum silicate and hydrated magnesium silicate. The concentration of silicate filler 314 in UV protective coating 310 may be at least about 20% by weight or, more specifically, at least about 40% by weight. In some examples, UV protective coating further comprises titanium oxide.

UV protective coating 310 may have a thickness of between 10 micrometers and 100 micrometers or, more specifically, between about 30 micrometers to 65 micrometers. UV protective coating 310 may have a transmittance of less than 1% in a wavelength range of 100 nanometers and 400 nanometers or, more specifically, less than 0.1% in a wavelength range of 100 nanometers and 400 nanometers.

Experimental Data

Figure 4:
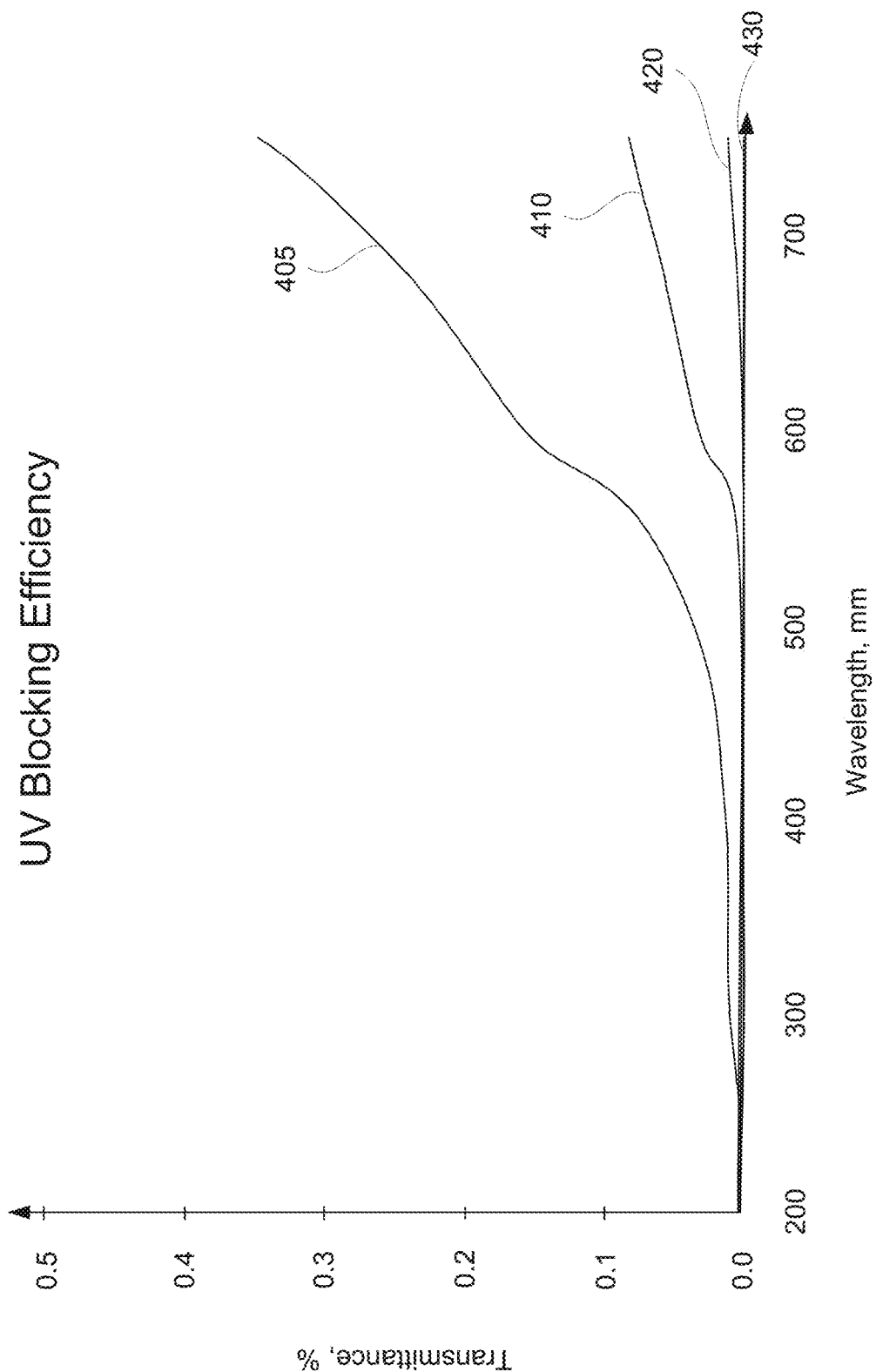
FIG. 4 illustrates UV blocking efficiency of UV protective coatings having different thicknesses.

FIG. 4 illustrates experimental data showing UV blocking efficiency of UV protective coatings having different thicknesses. All UV protective coatings had the same composition and were applied using the same spray technique. Specifically, the UV protective coatings included both hydrated aluminum silicate and hydrated magnesium silicate and titanium oxide.

Line 405 corresponds to a UV protective coating having a thickness of 13 micrometers (0.5 mils). Line 410 corresponds to a UV protective coating having a thickness of 25 micrometers (1.0 mils). Line 420 corresponds to a UV protective coating having a thickness of 50 micrometers (2 mils). Finally, line 430 corresponds to a UV protective coating having a thickness of 76 micrometers (3 mils). It has been found that even very thin UV protective coatings sufficiently block UV radiation for the entire range. Specifically, the thinnest test sample was only 13 micrometers thick and has a transmittance rate of less than 0.5% for the entire UV range.

Conclusion

Although the foregoing concepts have been described in some detail for purposes of clarity of understanding, after reading the above-disclosure it will be apparent that certain changes and modifications may be practiced within the scope of the appended claims. It should be noted that there are many alternative ways of implementing the processes, systems, and self-aligning riveting tools. Accordingly, the present examples are to be considered as illustrative and not restrictive.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

What is claimed is:

1. An epoxy-based component comprising:
   an epoxy-based composite part, comprising a composite base,
   wherein the composite base comprises epoxy and a surface; and
   an ultraviolet (UV) protective coating, disposed directly over and in contact with at least a portion of the epoxy-based composite part, wherein:
   the UV protective coating comprises a polyurethane polymer and silicate filler,
   the UV protective coating has a transmittance of less than 1% in a wavelength range of 100 nanometers to 400 nanometers,
   the silicate filler comprises a silicate selected from the group consisting of hydrated aluminum silicate, hydrated magnesium silicate, and mixtures thereof, and
   a concentration of the silicate filler in the UV protective coating is at least 20% by weight.

2. The epoxy-based component of claim 1, further comprising an epoxy primer layer, disposed directly over and in contact with the UV protective coating.

3. The epoxy-based component of claim 2, further comprising a polyimide-based coating, disposed directly over and in contact with the epoxy primer layer.

4. The epoxy-based component of claim 3, further comprising a decorative finish disposed directly over and in contact with the polyimide-based coating.

5. The epoxy-based component of claim 3, further comprising:
   a polyurethane topcoat disposed directly over and in contact with the polyimide-based coating and
   a decorative finish disposed directly over and in contact with the polyurethane topcoat.

6. The epoxy-based component of claim 1, wherein the UV protective coating has a thickness of between 10 micrometers to 100 micrometers.

7. The epoxy-based component of claim 1, wherein the UV protective coating has a thickness of between 30 micrometers to 65 micrometers.

8. The epoxy-based component of claim 1, wherein the silicate filler comprises both hydrated aluminum silicate and hydrated magnesium silicate.

9. The epoxy-based component of claim 1, wherein the UV protective coating further comprises titanium oxide.

10. The epoxy-based component of claim 1, wherein the UV protective coating has a transmittance of less than 0.1% in a wavelength range of 100 nanometers to 400 nanometers.

11. The epoxy-based component of claim 1, wherein the concentration of the silicate filler in the UV protective coating is at least 40% by weight.

12. The epoxy-based component of claim 1, wherein the UV protective coating further comprises silica.

13. The epoxy-based component of claim 1,
    wherein the epoxy-based composite part further comprises a surfacing film, disposed over the surface of the composite base, and
    wherein the UV protective coating is disposed directly over and in contact with at least a portion of the surfacing film.

14. The epoxy-based component of claim 13, wherein an additional portion of the surfacing film is free from contact with the UV protective coating.

15. The epoxy-based component of claim 1, wherein the UV protective coating is disposed directly over and in contact with the surface of the composite base.

16. The epoxy-based component of claim 1, wherein the epoxy-based component is an aircraft component.

17. The epoxy-based component of claim 1, wherein the epoxy-based component is selected from a fuselage component and a wing-box.

18. The epoxy-based component of claim 1, wherein the epoxy-based composite part comprises an epoxy prepreg resin and carbon fibers disposed within the epoxy prepreg resin.

19. The epoxy-based component of claim 17, wherein the carbon fibers are in a form of a woven fabric.

20. The epoxy-based component of claim 1, wherein the UV protective coating is deposited from a liquid comprising at least one of n-butyl acetate or 2-methoxy-1-methylethyl acetate.

* * * * *